(12) United States Patent
Gomelsky et al.

(10) Patent No.: US 10,146,277 B1
(45) Date of Patent: Dec. 4, 2018

(54) VEHICLE ADAPTER AND SEALED COOLING SYSTEM FOR PORTABLE COMMUNICATIONS DEVICE

(71) Applicant: MOTOROLA SOLUTIONS, INC., Chicago, IL (US)

(72) Inventors: Alexander Gomelsky, Holon (IL); Yaakov Moseri, Shoham (IL); Evgeny Bialik, Reshon Letzion (IL); Yossi Mizrahi, Reshon Letzion (IL); Michael Astanovsky, Hadera (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/703,920

(22) Filed: Sep. 13, 2017

(51) Int. Cl.
| | | |
|---|---|---|
| *H04B 1/00* | (2006.01) |
| *G06F 1/20* | (2006.01) |
| *B60R 11/02* | (2006.01) |
| *H01Q 1/24* | (2006.01) |
| *H01Q 1/32* | (2006.01) |
| *B60R 11/00* | (2006.01) |

(52) U.S. Cl.
CPC ............ *G06F 1/20* (2013.01); *B60R 11/0241* (2013.01); *H01Q 1/242* (2013.01); *H01Q 1/32* (2013.01); *B60R 2011/0075* (2013.01)

(58) Field of Classification Search
CPC .................................................... H04B 1/3877
USPC ............................................ 455/575.9, 569.2
See application file for complete search history.

(56) References Cited

U.S. PATENT DOCUMENTS

| 5,029,236 A * | 7/1991 | Yasuda ................... H04B 1/036 361/697 |
| 5,230,016 A * | 7/1993 | Yasuda ................. H02J 7/0044 379/426 |
| 6,522,535 B1 * | 2/2003 | Helot .................... G06F 1/1632 165/104.34 |
| 7,457,113 B2 * | 11/2008 | Kumhyr .................. G06F 1/203 165/80.3 |
| 7,480,140 B2 | 1/2009 | Hara et al. |
| 9,031,616 B2 * | 5/2015 | Gagne ................... H04M 1/185 345/633 |
| 9,641,207 B1 * | 5/2017 | Bevers ................. H04B 1/3877 |
| 9,884,397 B2 * | 2/2018 | Seitz ...................... B23Q 11/14 |
| 2002/0179286 A1 * | 12/2002 | Sterner ................... F28D 15/02 165/80.3 |
| 2005/0225940 A1 * | 10/2005 | Walters ..................... G06F 1/20 361/695 |

(Continued)

FOREIGN PATENT DOCUMENTS

JP 2014131138 7/2014

*Primary Examiner* — Wen Huang
(74) *Attorney, Agent, or Firm* — Michael Best & Friedrich LLP

(57) ABSTRACT

A vehicle adapter configured to be mounted to a vehicle. The vehicle adapter includes a body sized and shaped to receive and hold a portable communications device, the body including a surface configured to press against the portable communications device. The vehicle adapter further includes a cooling system coupled to the body, the cooling system including a conduit configured to deliver a coolant to an internal channel of the portable communications device. The conduit defines a projection sized and shaped to press against and open a valve on the portable communications device when the portable communications device is received into the vehicle adapter.

24 Claims, 5 Drawing Sheets

(56) References Cited

U.S. PATENT DOCUMENTS

| | | | |
|---|---|---|---|
| 2010/0005832 A1* | 1/2010 | Grozinger | F28D 15/0266 |
| | | | 62/515 |
| 2015/0325889 A1* | 11/2015 | Jung | H01M 2/10 |
| | | | 429/72 |
| 2015/0350392 A1* | 12/2015 | Park | H04M 1/0202 |
| | | | 455/575.6 |
| 2017/0168531 A1* | 6/2017 | Casparian | G06F 1/206 |

* cited by examiner

US 10,146,277 B1

VEHICLE ADAPTER AND SEALED COOLING SYSTEM FOR PORTABLE COMMUNICATIONS DEVICE

BACKGROUND OF THE INVENTION

Many modern portable communications devices have a vehicle adapter that is mounted on a vehicle dashboard. The dashboard configuration provides access to power sources for battery charging and facilitates user access to device displays for operating the devices and interacting with applications running on the devices. Due to simultaneous charging, application usage (for example vehicle navigation), and/or prolonged exposure to direct sunlight, the portable communications devices or components therein may experience a significant rise in temperature.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
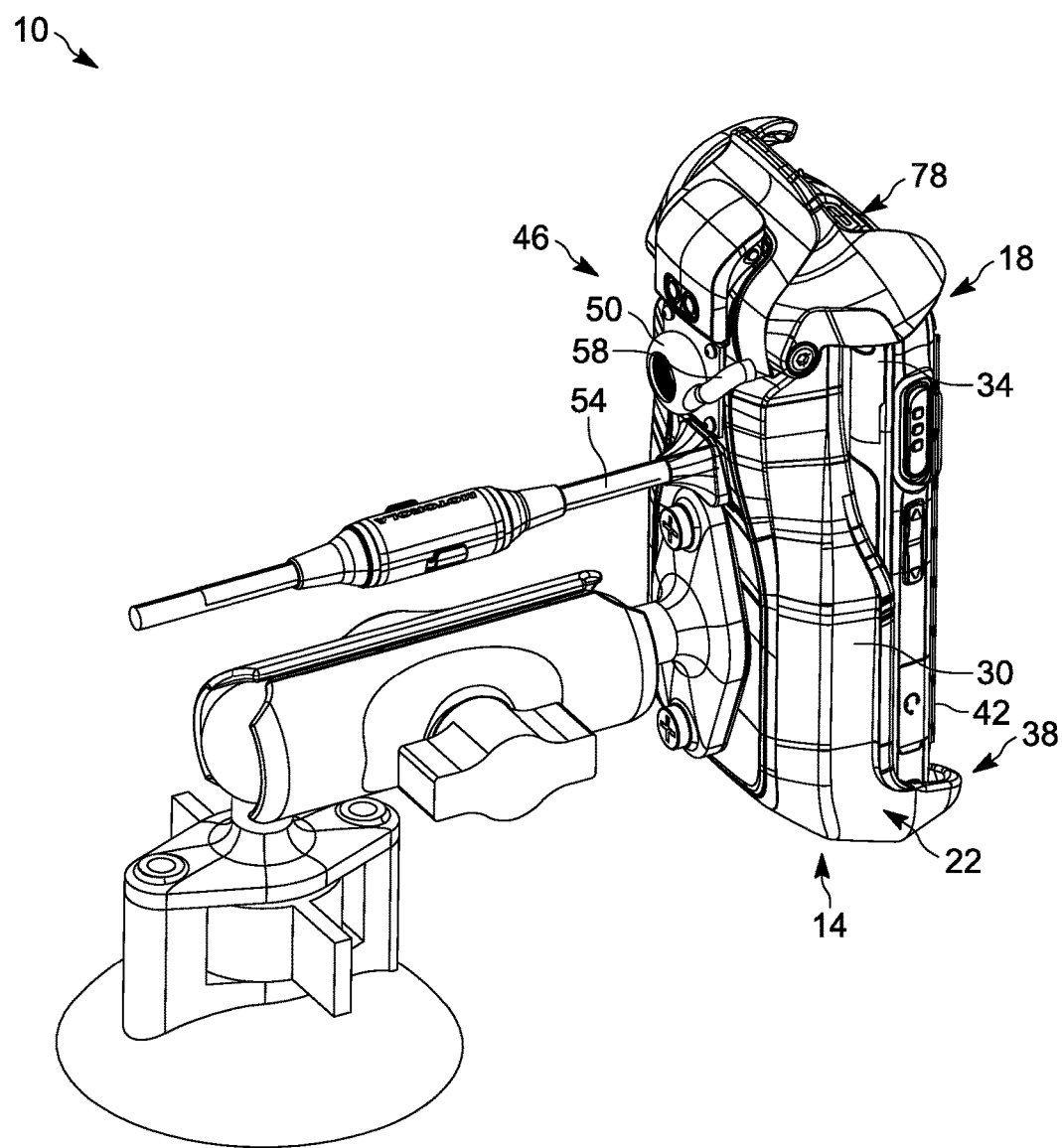
FIG. 1 illustrates a cooling system for a portable communications device in accordance with one embodiment.
Figure 2:
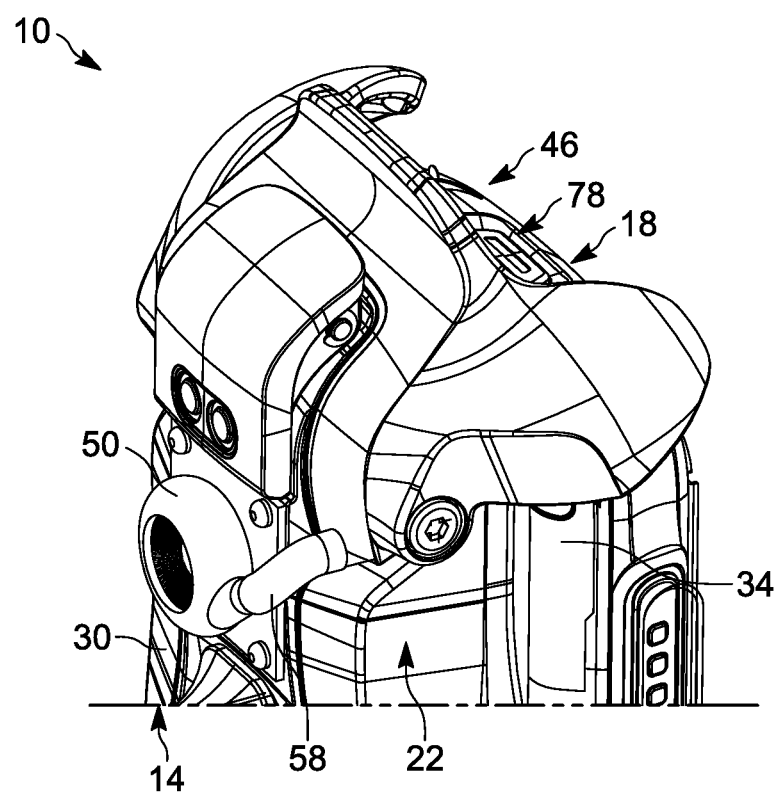
FIG. 2 illustrates a partial, enlarged view of the cooling system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

One embodiment provides a vehicle adapter configured to be mounted to a vehicle. In one example, the vehicle adapter includes an adapter body sized and shaped to receive and hold a portable communications device, the adapter body including an interior surface configured to press against the portable communications device, and an exterior surface disposed opposite the interior surface. The vehicle adapter further includes a cooling system coupled to the adapter body. The cooling system includes a conduit configured to deliver a coolant to an internal channel of the portable communications device. The conduit defines a projection sized and shaped to press against and open a valve on the portable communications device when the portable communications device is received in the vehicle adapter.

Another embodiment provides a portable communications device. In one example, the portable communications device includes a device body sized and shaped to be received and held in a vehicle adapter. The device body is formed of an exterior surface that presses against an interior surface of the vehicle adapter. The portable communications device further includes an internal channel disposed within the device body to receive a coolant. The internal channel has an inlet end and an outlet end. The portable communications device further includes a one-way valve disposed at the inlet end.

Another embodiment provides a cooling system for a portable communications device. In one example, the cooling system includes a vehicle adapter. The vehicle adapter includes a vehicle adapter body having an interior surface and an opposite, exterior surface, and a cooling system coupled to the vehicle adapter body. The cooling system includes a conduit that defines a projection extending from the interior surface of the vehicle adapter body. The cooling system further includes a portable communications device configured to be coupled to the vehicle adapter body. The portable communications device includes a device body and an internal channel disposed within the device body to receive a coolant from the cooling system. The internal channel has an inlet end and an outlet end.

FIGS. 1-6 illustrate a cooling system 10 for a portable communications device. In the example illustrated, the cooling system 10 includes a vehicle adapter 14, and a portable communications device 18 that is releasably received into the vehicle adapter 14 for charging and/or application usage. While the vehicle adapter 14 is described and illustrated in the context of use in a motor vehicle, the vehicle adapter 14 may be used in other vehicles or environments, for example in rooms or other stationary environments where the portable communications device 18 may be charged and/or used for application purposes. Additionally, while the portable communications device 18 is described and illustrated as a handheld phone, the portable communications device 18 may be any of a number of other types of portable communications devices, including two-way radio receivers/transmitters and the like.

With reference to FIGS. 1-6, the vehicle adapter 14 includes a vehicle adapter body 22 having an interior surface 26 and an opposite, exterior surface 30. The interior surface 26 is configured to contact an exterior surface 34 of the portable communications device 18 when the portable communications device 18 has been received in the vehicle adapter 14. In the illustrated embodiment, the adapter body 22 includes a receiving area 38 that is sized and shaped to receive a lower end 42 of the portable communications device 18, and to cradle or carry the lower end 42. The receiving area 38 acts as a pocket to receive a portion of the portable communications device 18. In some embodiments, the portable communications device 18 may be held in the receiving area 38 via a frictional fit, and/or the vehicle adapter 14 may include one or more clips, detent mechanisms, or other retaining structures along the adapter body 22 to releasably couple the portable communications device 18 to the vehicle adapter 14. In some embodiments, the vehicle adapter 14 may include an electrical connector (for example a plug or other electrical contact in the receiving area 38 or elsewhere along the adapter body 22) that contacts the portable communications device 18 when the portable communications device 18 has been received in the vehicle adapter 14. The electrical connector may be used to recharge the portable communications device 18, or to provide signals to or from the portable communications device.

With continued reference to FIGS. 1-6, the vehicle adapter 14 further includes a cooling system 46 coupled to the adapter body 22. The cooling system 46 includes a cooling source 50 for providing a coolant (for example cool air, cool water, cool nitrogen, and the like) to the portable communications device 18. The cooling source 50 may be any of a number of different types of cooling sources including an air blower, a water pump, a pressurized container (for example a pressurized source of air), and the like. In the illustrated embodiment the cooling source 50 is an air blower coupled directly to the exterior surface 30 of the adapter body 22, and is coupled to one or more wires 54 (FIG. 1) that deliver power (for example from a DC power source) to a motor that drives a circulating blade.

With reference to FIGS. 1-5, the cooling system 46 also includes a conduit 58 coupled to the cooling source 50. The conduit 58 extends from the cooling source 50 toward the portable communications device 18. The conduit 58 defines a projection 62 (FIG. 5) that extends into and/or presses against a portion of the portable communications device 18. In the example illustrated in FIG. 5, the conduit 58 includes two sections coupled together, a first section 66 that extends directly from the cooling source 50, and a second section 70 that is formed as part of the vehicle adapter body 22 itself, and is coupled to the first section 66. The second section 70 includes the projection 62. In some embodiments the projection 62 extends to (or past) the interior surface 26. In some embodiments the conduit 58 may be just a single piece that extends directly from the cooling source 50 and through the adapter body 22. The conduit 58 receives air from the fan-driven air blower and delivers the air to the portable communications device 18. The conduit 58 forms a rounded tube, although other embodiments may include different structures or sets of structures to deliver a coolant to the portable communications device 18.

Figure 3:
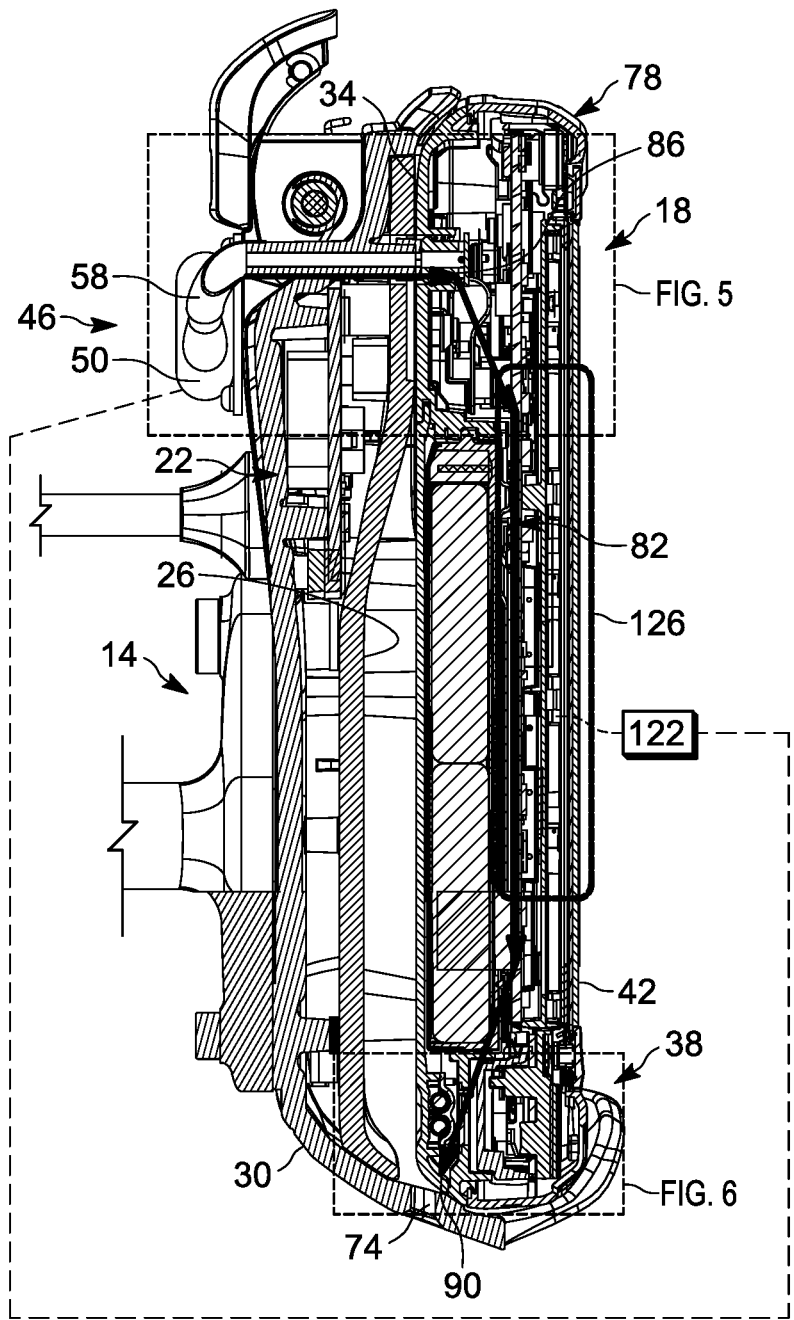
FIG. 3 illustrates a side, cross-sectional view of the cooling system, and a flow of a coolant passing through the cooling system.
Figure 5:
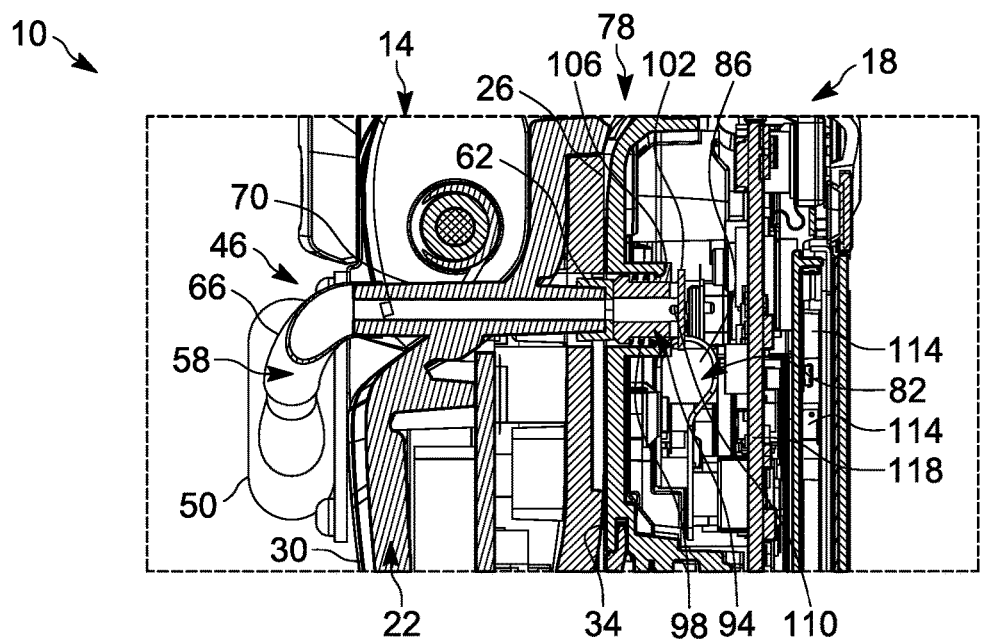
FIG. 5 illustrates a partial, enlarged cross-sectional view of the cooling system, and an inlet end of an internal channel in the portable communications device.
Figure 6:
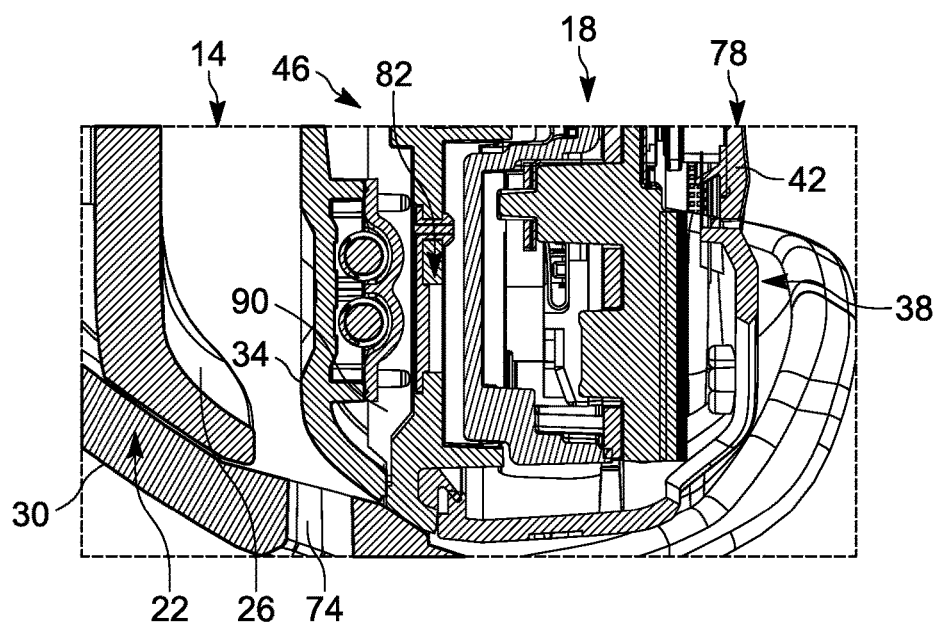
FIG. 6 illustrates a partial, enlarged cross-sectional view of the cooling system, and an outlet end of the internal channel.

With reference to FIGS. 3, 5, and 6, the cooling system 46 further includes a vehicle adapter outlet 74 in the receiving area 38 of the adapter body 22. The vehicle adapter outlet 74 is a through-opening in the adapter body 22 that provides an outlet for coolant to exit into an outside environment exterior to the adapter body 22.

Figure 4:
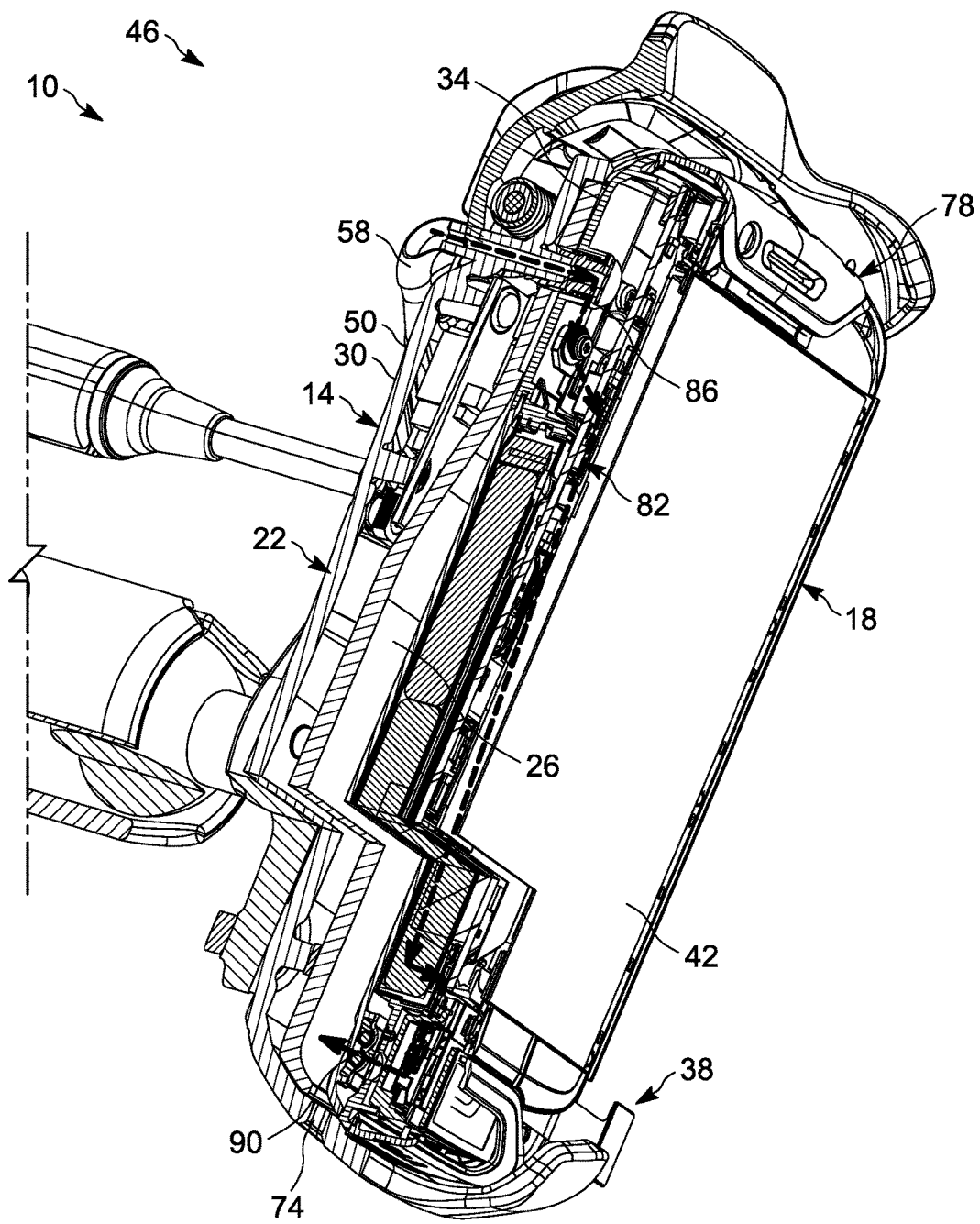
FIG. 4 illustrates a perspective, cross-sectional view of the cooling system, and the flow of a coolant passing through the cooling system.

With reference to FIGS. 1-6, the portable communications device 18 includes a device body 78 sized and shaped to be received and held in the vehicle adapter 14. The device body 78 forms the exterior surface 34 that presses against the interior surface 26 of the vehicle adapter 14. An internal channel 82 is disposed within the device body 78. The internal channel 82 receives the coolant from the cooling source 50 and the conduit 58. The internal channel 82 has an inlet end 86 (FIGS. 4 and 5) and an outlet end 90 (FIGS. 4 and 6). In the illustrated embodiment the internal channel 82 forms a circuitous pathway (see arrows in FIGS. 3 and 4) between the inlet end 86 and the outlet end 90 for movement of the coolant through the portable communications device 18. Other embodiments include different pathways, as well as different numbers of inlets, outlets, conduits, and channels than those illustrated. For example, in some embodiments the cooling system 46 may include two conduits 58 that deliver coolant from the cooling source 50 to two different inlet ends 86 in the same internal channel 82. In some embodiments, the cooling system 46 may include two conduits 58 that deliver coolant to two different inlet ends 86 for two separate internal channels 82 in the portable communications device 18. In some embodiments, the internal channel 82 may bifurcate or divide into a plurality of different internal channels each having its own separate outlet end 90. Additionally, while the inlet end 82 is illustrated generally at a top of the portable communications device 18 and the outlet end 90 is illustrated generally at a bottom of the portable communications device 18, in other embodiments the inlet end 86 and the outlet end 90 may be located elsewhere. For example, in some embodiments the inlet end 86 may be located generally at a bottom of the portable communications device 18 and the outlet end 90 may be located generally at a top of the portable communications device 18. In yet other embodiments, both the inlet end 86 and the outlet end 90 may be located generally at a top, or a bottom, of the portable communications device 18.

With reference to FIG. 5, the portable communications device 18 includes a valve 94 disposed at the inlet end 86. In the illustrated embodiment, the valve 94 is a one-way, spring-loaded valve that is biased toward an exterior of the portable communications device 18 (to the left in FIG. 5) with a spring 98. Other embodiments include different types of valves (for example ball valves, diaphragm valves, and the like). The cooling system 46 is a sealed cooling system. For example, when the portable communications device 18 is not yet received in the vehicle adapter 14, the valve 94 is in a naturally biased position, and closes off and seals the inlet end 86 of the internal channel 82. In the illustrated embodiment the valve 94 includes a sealing flange 102 that presses against a portion 106 of the device body 78 in the naturally biased position. A portion of the valve 94 is visible along the device body 78 when the portable communications device 18 is not received in the vehicle adapter 14.

With continued reference to FIG. 5, when the portable communications device 18 is received in the vehicle adapter 14, the projection 62 aligns with and contacts the valve 94, pressing the valve 94 away from its naturally biased position and into an interior of the portable communications device 18 (as seen in FIG. 5). This inward movement of the valve 94 moves the sealing flange 102 away from the portion 106 of the device body 78, exposing an aperture 110 (or other opening or openings) along the valve 94 to the internal channel 82 of the portable communications device 18. With the valve 94 moved inwardly by the projection 62, the internal channel 82 is placed into communication (for example fluid communication) with the conduit 58, such that the coolant exiting the cooling source 50 may pass through the conduit 58 and into the internal channel 82 through the aperture 106.

With reference to FIGS. 3, 4, and 6, the outlet end 90 may include a fixed opening or openings in the device body 78, permanently open to an environment outside of the portable communications device. Thus, when the coolant enters through the inlet end 86, the coolant is free to travel through the internal channel 82 to the outlet end 90 and into the outside environment. In other embodiments, the portable communications device 18 may include a valve at the outlet end 90. Similar to the valve 94, the valve at the outlet end 90 may be spring-loaded, and in a naturally biased position may close off for example and seal the outlet end 90, such that both the inlet end 86 and the outlet end 90 and the internal channel 82 overall are sealed from an outside environment when the portable communications device is not coupled to the vehicle adapter 14. In some embodiments, the valve at the outlet end 90 may open, for example, and a permit the coolant to exit the portable communications device 18 when the coolant entering the portable communications device 18 has accumulated a predetermined pressure within the internal channel 82. In yet other embodiments, the valve at the outlet end 90 may open when the valve physically contacts a conduit extending from the vehicle adapter 14, similar to the valve 94 and the conduit 58. Other embodiments include various other valve arrangements (for example one-way valve arrangements or other valve arrangements) than that illustrated, and/or include other structures that control a flow of a coolant into and out of the portable communications device 18.

With reference to FIG. 5, in the illustrated embodiment the internal channel 82 is separated from internal electrical components 114 of the portable communications device 18 by a wall 118 (for example made of a thermally conductive material) that seals the internal components 114 apart from the internal channel 82. Thus, the internal components 114 are not exposed to the coolant directly, in particular when the coolant is water. Instead, the wall 118 acts as a heat exchanger to transfer heat from the electrical components 114 to the coolant as the coolant moves through the internal channel 82. In other embodiments the portable communications device 18 does not include the wall 118. Rather, the coolant (for example air) is permitted to pass directly over and contact one or more electrical components 114 as the coolant moves through the internal channel 82.

With reference to FIGS. 1-6, in the illustrated embodiment, during use the portable communications device 18 is first inserted into the vehicle adapter 14, such that the lower end 42 of the portable communications device 18 is received into the receiving area 38. As the portable communications device 18 is being inserted, the projection 62 presses against the valve 94, thereby moving the valve 94 and providing an open communication between the conduit 58 and the internal channel 82. The portable communications device 18 may include a controller 122 (illustrated schematically in FIG. 3) that is programmed to run a temperature sensing algorithm. When the temperature sensing algorithm indicates that the temperature of the portable communications device 18 has reached a certain level, the cooling source 50 is activated (for example the fan is turned on), thereby generating movement of the coolant through the conduit 58 and into the internal channel 72. In other embodiments, the cooling source 50 may be activated immediately once the valve 94 has been moved (for example via communication between the controller 122, the valve 94, and/or the cooling source 50, or via manual command or operation of the cooling source 50). In yet other embodiments the vehicle adapter 14 may include a sensor or sensors to detect a rise in temperature of the portable communications device 18, and may transmit signals from those sensors to the cooling source 50 to activate the cooling source 50. As illustrated in FIG. 3, once the coolant begins to pass through the internal channel 70, the movement of the coolant generates a zone 126 of cooling generally adjacent the electrical components 114. Once the coolant has moved past the electrical components 114, the warmed coolant then exits through the outlet end 90 and through the vehicle adapter outlet 74.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A vehicle adapter configured to be mounted to a vehicle, the vehicle adapter comprising:
   a body sized and shaped to receive and hold a portable communications device, the body comprising an interior surface configured to press against the portable communications device, and an exterior surface disposed opposite the interior surface; and
   a cooling system coupled to the body, the cooling system including a conduit configured to deliver a coolant to an internal channel of the portable communications device, wherein the conduit defines a projection, wherein the projection is sized and shaped to press against and open a valve on the portable communications device when the portable communications device is received into the vehicle adapter.

2. The vehicle adapter of claim 1, wherein the conduit is a tube.

3. The vehicle adapter of claim 1, wherein coolant is air, and wherein the cooling system includes an air blower to generate movement of air through the conduit.

4. The vehicle adapter of claim 3, wherein the air blower includes a circulating fan blade.

5. The vehicle adapter of claim 3, wherein the air blower is coupled to the exterior surface and to the conduit, such that the conduit extends from the air blower toward the interior surface of the body.

6. The vehicle adapter of claim 1, wherein the coolant is water, wherein the cooling system includes a pump to generate movement of the water through the conduit.

7. A portable communications device comprising:
a body sized and shaped to be received and held in a vehicle adapter, the body formed of an exterior surface that presses against an interior surface of the vehicle adapter;
an internal channel disposed within the body to receive a coolant, the internal channel having an inlet end and an outlet end; and
a one-way valve disposed at the inlet end.

8. The portable communications device of claim 7, wherein the internal channel is separated from internal electrical components of the portable communications device by a wall that seals the internal components apart from the internal channel, wherein the wall is a heat exchanger.

9. The portable communications device of claim 7, wherein the one-way valve is a spring-loaded valve.

10. The portable communications device of claim 7, wherein the one-way valve is positioned along the exterior surface of the body, such that the one-way valve is exposed to an environment outside of the portable communications device.

11. The portable communications device of claim 7, wherein the internal channel defines a circuitous pathway through the portable communications device for introduction and removal of the coolant.

12. The portable communications device of claim 7, wherein the valve is configured to be manually moved from a first position where the inlet end of the internal channel is sealed, to a second position where the inlet end is opened.

13. The portable communications device of claim 7, wherein the valve includes a sealing flange configured to press against a portion of the body in a first position of the valve, wherein portable communications device further includes a spring configured to bias the valve toward the first position, wherein the valve is movable to a second position by compressing the spring.

14. A cooling system for a portable communications device, the cooling system comprising:
a vehicle adapter including:
a vehicle adapter body having an interior surface and an opposite, exterior surface; and
a cooling system coupled to the vehicle adapter body, the cooling system including a conduit that defines a projection;
a portable communications device configured to be coupled to the vehicle adapter body and to the projection, the portable communications device including:
a device body; and
an internal channel disposed within the device body to receive a coolant from the cooling system, the internal channel having an inlet end and an outlet end.

15. The cooling system of claim 14, wherein the conduit is a tube.

16. The cooling system of claim 14, wherein coolant is air, and wherein the cooling system includes an air blower coupled to the exterior surface to generate movement of air through the conduit and into the internal channel.

17. The cooling system of claim 16, wherein the air blower includes a circulating fan blade.

18. The cooling system of claim 14, wherein the coolant is water, wherein the cooling system includes a pump coupled to the exterior surface to generate movement of water through the conduit and into the internal channel.

19. The cooling system of claim 14, wherein the portable communications device includes a one-way valve at the inlet end, wherein the projection is configured to move and open the one-way valve when the portable communications device is coupled to the vehicle adapter.

20. The cooling system of claim 19, wherein the one-way valve is a spring-loaded valve.

21. The cooling system of claim 19, wherein the valve is movable from a first position where the inlet end of the internal channel is sealed, to a second position where the inlet end is opened.

22. The cooling system of claim 19, wherein the valve includes a sealing flange configured to press against a portion of the body in a first position of the valve, wherein portable communications device further includes a spring configured to bias the valve toward the first position, wherein the valve is movable to a second position by compressing the spring.

23. The cooling system of claim 14, wherein the internal channel defines a circuitous pathway through the portable communications device for introduction and removal of the coolant.

24. The cooling system of claim 14, wherein the portable communications device is attached to the vehicle adapter, such that the projection is pressed against a one-way valve on the portable communications device to permit coolant to enter the internal channel.

* * * * *